UNITED STATES PATENT OFFICE.

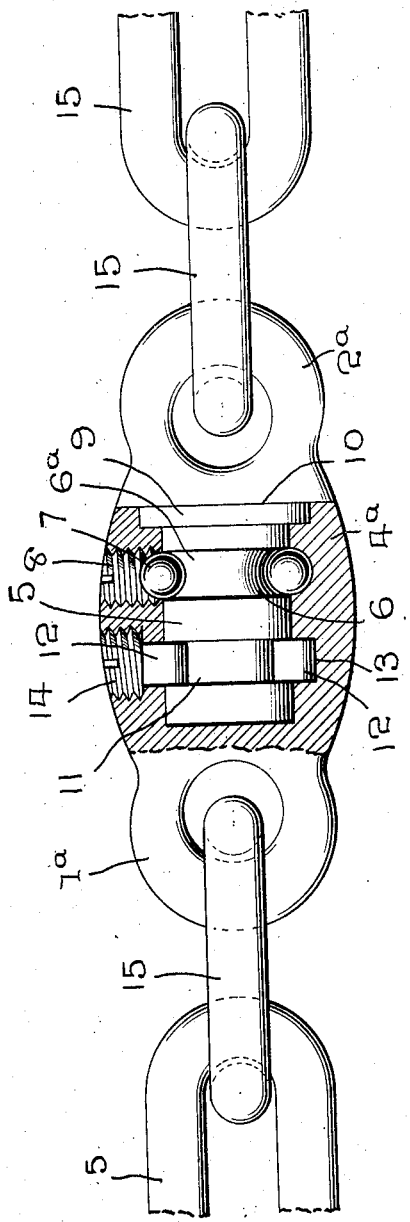

WILLIAM R. CLARKSON, OF TENINO, WASHINGTON.

SWIVEL.

933,625.

Specification of Letters Patent.   Patented Sept. 7, 1909.

Application filed November 25, 1908. Serial No. 464,360.

*To all whom it may concern:*

Be it known that I, WILLIAM R. CLARKSON, a citizen of the United States, residing at Tenino, in the county of Thurston and State of Washington, have invented certain new and useful Improvements in Swivels; and I do hereby declare the following to be a full, clear, and exact description of the invention, such as will enable others skilled in the art to which it appertains to make and use the same.

My invention relates to improvements in swivels or connecting means for chains, cables and the like, and has for its object to provide a ball-bearing swivel which is adapted to instantly conform to the strain placed thereupon, thus preventing the cable, chain or the like from becoming unduly twisted incident to the use thereof.

A further object of my invention is to provide a reliably efficient means for utilizing ball or roller bearings, and thereby, as a consequence, reducing the torsional strain to the minimum, and insuring that the opposite ends of the swivel shall quickly respond as to alinement between the parts.

Other objects and advantages of the invention will be fully disclosed hereinafter.

The invention consists of certain features and instrumentalities substantially as hereinafter fully disclosed and specifically defined by the claim.

In the accompanying drawings illustrating my invention: the figure discloses my swivel as applied to a chain, cable, rope, rods, etc.

Referring to the drawing, $1^a$ and $2^a$ indicate opposite end portions of my swivel, the member $1^a$ being the female portion, and being provided with an ear for engaging the cable 3, or chain, as the case may be. The body portion $4^a$ is provided with a socket designed to receive the stem or shaft 5 of the member $2^a$, said stem or shaft being provided with a groove 6, of sufficient depth to receive one half of the anti-friction balls 7, while the other half of the balls occupy a contiguous groove or seat $6^a$ in said body portion, being suitably located to register with, and complement the groove 6, as will be readily understood. In order to permit of the introduction of the anti-friction balls 7 within said complemental groove, the body portion $4^a$ is provided at a suitable point with an opening, said opening being screw-threaded to receive a retaining screw-threaded plug 8, whereby when a sufficient number of balls has been introduced through said opening, said plug may be turned home, and said balls securely locked in operative position. Said plug has its inner end formed with a concavity in order to conform to the corresponding contour of the bearing balls, thus providing for aiding in forming the annular groove for said bearing balls. It is also preferable to form an offset or shoulder 9, and a flange 10, upon the member $2^a$ and correspondingly shape the opposite surface of the body portion $4^a$, whereby a dust-proof joint will be formed to insure against undue wear to the interior bearings. Also the shaft 5 of the member $2^a$ is provided with an additional groove 11, differing from the aforesaid groove in having right lined walls, and adapted to receive a plurality of anti-frictional rollers 12 of cylindrical outline, said groove being of proper depth to receive but one half of said rollers, the other half of said rollers being accommodated by a groove 13 formed in a contiguous part of the casing or body portion $4^a$ and also having right lined walls. Also a suitable screw-threaded plug 14 is adapted to be received by, and inserted into a screw-threaded opening through which the anti-friction rollers are introduced into said grooves 11 and 13. By providing both anti-friction rollers and balls, greater strength is afforded the parts, and the swivel thus formed will be able to resist a much greater strain placed thereon.

It will be observed that the ears or members $1^a$ and $2^a$ are adapted for the attachment thereto of either a chain or cable, the links of the latter being designated by the numeral 15.

What I claim is:

A device of the character described, comprising interlocking sections, each having a number of complemental grooves, one of said grooves in each of said sections having right lined walls and corresponding bearing rollers arranged in said complemental grooves, the other grooves of said sections having concaved walls, and bearing balls arranged in said grooves, and screw-threaded plugs having engagement with one of said sections, one of said plugs being concaved upon its inner end and the other plug having a right lined inner-end surface.

In testimony whereof I have signed my name to this specification in the presence of two subscribing witnesses.

WILLIAM R. CLARKSON.

Witnesses:
W. E. WRIGHT,
G. BIRCKHEAD.